(12) United States Patent
Moos et al.

(10) Patent No.: US 7,349,807 B2
(45) Date of Patent: Mar. 25, 2008

(54) QUANTITATIVE RISK ASSESSMENT APPLIED TO PORE PRESSURE PREDICTION

(75) Inventors: Daniel Moos, Palo Alto, CA (US); Pavel Peska, Prague, TX (US); Chris Ward, Houston, TX (US)

(73) Assignee: GeoMechanics International, Inc., Houston, TX (US)

(*) Notice: Subject to any disclaimer, the term of this patent is extended or adjusted under 35 U.S.C. 154(b) by 0 days.

(21) Appl. No.: 11/075,300

(22) Filed: Mar. 8, 2005

(65) Prior Publication Data

US 2005/0197780 A1    Sep. 8, 2005

Related U.S. Application Data

(60) Provisional application No. 60/550,708, filed on Mar. 8, 2004.

(51) Int. Cl.
*G01V 1/28* (2006.01)
(52) U.S. Cl. ............................................. 702/9; 702/13
(58) Field of Classification Search .................... 702/6, 702/9, 12, 13, 14, 18; 703/10
See application file for complete search history.

(56) References Cited

U.S. PATENT DOCUMENTS

| | | | |
|---|---|---|---|
| 4,932,003 A | 6/1990 | Winbow et al. | 367/75 |
| 6,473,696 B1 | 10/2002 | Onyia et al. | 702/6 |
| 6,694,261 B1 | 2/2004 | Huffman | 702/1 |
| 2003/0110018 A1 | 6/2003 | Dutta et al. | 703/10 |

OTHER PUBLICATIONS

Daniel Moos, "Wellbore Stability in Deep Water—Handling Geomechanical Uncertainty", AADE National Drilling Technical Conference, Mar. 27-29, 2001, pp. 1-13.*
N. C. Dutta; *Deepwater geohazard prediction using prestack inversion of large offset P-wave data and rock model*, The Leading Edge, Feb. 2002, pp. 193-198, 12 Figs.
G. H. F. Gardner et al.; *Formation Velocity and Density—The Diagnostic Basics for Stratigraphic Traps*, Geophysics, vol. 39, No. 6 (Dec. 1974), pp. 770-780, 9 Figs., 3 Tables.
Per Horsrud; *Estimating Mechanical Properties of Shale From Empirical Correlations*, SPE Drilling &Completion, Jun. 2001, pp. 68-73.
Glenn L. Bowers; *Pore Pressure Estimation From Velocity Data: Accounting for Overpressure Mechanisms Besides Undercompaction*, SPE Drilling & Completion, Jun. 1995, pp. 89-95, 14 Figs.
Q. J. Liang; *Application of Quantitative Risk Analysis to Pore Pressure and Fracture Gradient Prediction*, SPE 77354, SPE Annual Technical Conference and Exhibition, Sep. 29-Oct. 2, 2002, pp. 1-9, 10 Figs.

(Continued)

*Primary Examiner*—Donald E McElheny, Jr.
(74) *Attorney, Agent, or Firm*—Madan, Mossman & Sriram, P.C.

(57) ABSTRACT

Pre-drill pore pressure and fracture gradient predictions obtained from seismic velocity data are used in well design taking into account uncertainties in the velocity estimation and in the models that use the velocities to determine pore pressure. Using geological constraints, limits are established on hydrocarbon column height. It is also possible to predict the relative number of casings required to reach target reservoirs.

27 Claims, 16 Drawing Sheets
(4 of 16 Drawing Sheet(s) Filed in Color)

OTHER PUBLICATIONS

C.M. Sayers et al.; *Predrill Pore Pressure Prediction Using Seismic Data*, IADC/SPE 59122, 2000 IADC/SPE Drilling Conference, Feb. 23-25, 2000, pp. 1-7, 10 Figs.

Alberto Malinverno et al.; *Integrating Diverse Measurements to Predict Pore Pressure with Uncertainties*, SPE 90001, SPE Annual Technical Conference and Exhibition, Sep. 26-29, 2004, pp. 1-11, 11 Figs.

Daniel Moos et al.; *Quantitative Risk Assessment Applied to Predrill Pore Pressure, Sealing Potential, and Mud Window Predictions from Seismic Data*, ARMA/NARMS 04-499, Gulf Rocks 2004, 6th North America Rock Mechanics Symposium (NARMS), Jun. 5-9, 2004, pp. 1-8, 10 Figs.

P.M. Doyen et al.; *Seismic pore pressure prediction with uncertainty using a probabilistic mechanical earth model*, SEG Expanded Abstracts 22, 1366 (2003), 4 Figs.

Lopez et al.; *Integrated shared earth model: 3D pore-pressure prediction and uncertainty analysis*, The Leading Edge, Jan. 2004, pp. 52-59, 10 Figgs.

\* cited by examiner

QUANTITATIVE RISK ASSESSMENT APPLIED TO PORE PRESSURE PREDICTION

CROSS REFERENCES TO RELATED APPLICATIONS

This applications claims priority from U.S. Provisional Patent Application Ser. No. 60/550,708, filed on Mar. 8, 2004.

BACKGROUND OF THE INVENTION

1. Field of the Invention

The present invention relates generally to geophysical exploration and more particularly to methods for accurately estimating uncertainties in pore pressure and fracture gradient estimation prior to drilling of a well.

2. Description of the Related Art

Drilling of wells is carried out using a bottomhole assembly that includes a drillbit. During the drilling process, drilling fluid, also referred to as drilling mud, is pumped down the borehole to facilitate the drilling process, cool and lubricate the drillbit, and remove drill cuttings to the surface. If the borehole fluid pressure is significantly below the formation fluid pressure, there is a risk of a catastrophic blowout. On the other hand, if the borehole pressure is much greater than the formation fluid pressure, the risk of blowout is eliminated but there is risk of formation damage due to fracturing and the mud invading the formation. The fluid pressure is a function of the density of the drilling mud ("mud weight") so an important part of the drilling process is the proper selection of mud weight for drilling.

It is standard practice when planning wells to utilize seismic data to compute pore pressure and fracture gradient profiles to use as upper and lower bounds on required mud weights for safe drilling. U.S. Pat. No. 6,473,696 to Onyia et al. discloses a method of determination of fluid pressures in a subsurface region of the earth that uses seismic velocities and calibrations relating the seismic velocities to the effective stress on the subsurface sediments. The seismic velocities may be keyed to defined seismic horizons and may be obtained from many methods, including velocity spectra, post-stack inversion, pre-stack inversion, VSP or tomography. Overburden stresses may be obtained from density logs, relations between density and velocity, or front inversion of potential fields data. The various methods are part of an integrated computer program.

Sayers et al. disclose a method for the use of seismic velocities used during seismic processing to optimize the stack/migration result, with local fluctuations being smoothed out and the velocity sampling interval usually being too coarse for accurate pore pressure prediction. Various methods of determining seismic interval velocities from prestack seismic data are compared, and a velocity analysis approach suitable for pore pressure prediction is recommended.

Methods have also been developed for identification of shallow water flow hazards where abnormally high pore pressures exist in shallow sub-bottom sediments drilled in deep water. U.S. Pat. No. 6,694,261 to Huffman teaches the detection of such abnormally pressured zones by amplitude versus offset (AVO) analysis of the reflected amplitudes of compressional or shear reflections. Measurements of the amplitude of reflected shear waves from a formation at some depth below the anomalous zone may also be used to detect the presence of abnormally pressured intervals with low shear velocity and high shear wave attenuation. U.S. 2003/0110018 of Dutta et al. addresses the identification of shallow water flow hazards using seismic inversion methods.

None of the methods discussed above address the issue of errors caused by uncertainty in the measurements and by uncertainty in the modeling process. By quantifying uncertainties in pore pressure and other predicted values, and more importantly by determining their origin, it is possible not only to begin to quantify the drilling risk but also to make decisions about how best to reduce that risk. For example, if uncertainties in the velocities used as input to the predictions contribute large uncertainties to the results, this may dictate reanalysis of the seismic data. If uncertainties are related to the functions used to compute density or effective stress, this might lead to a recommendation to reduce those uncertainties using additional measurements on core or using offset log data.

Liang discloses application of a method of quantitative risk analysis (QRA) to the problem of pore pressure and fracture gradient prediction. The method relies on a vast sampling over a prospect area of borehole measurements to determine such parameters as density, acoustic velocity and pressure gradient. The uncertainties are then determined from variations in the measured parameters. Underlying this uncertainty determination is the assumption that measurements of parameters such as density and acoustic velocity are invariant with spatial location ("the ground truth"), and the variations are inherent. This is not a reasonable assumption as it is well known that there are systematic variations in velocity and density with spatial location. In addition, Liang assumes an Gaussian distribution to characterize the undertainty. Such an assumption is commonly not satisfied, and distributions like the log-normal are quite common. Furthermore, Liang does not account for overpressure mechanisms other than undercompaction. It would be desirable to have a method of QRA that is applicable to the problem of pore pressure and fracture gradient prediction that does not make these assumptions and does not require a large sampling of measurements to establish the ground truth. The present invention satisfies this need.

SUMMARY OF THE INVENTION

One embodiment of the present invention is a method for evaluating a reservoir in a subsurface region of an earth formation. The method uses obtained velocities of the subsurface region from a seismic survey; and estimates from the obtained velocity a formation pore pressure, and an uncertainty associated with the estimated pore pressure. The uncertainty depends at least in part on an uncertainty in the obtained velocity. The formation pore pressure may be estimated using density and effective stress determined from the seismic velocity. Predetermined velocity-density and velocity-effective stress relationships may be used. The uncertainty in pore pressure estimate may further depend upon uncertainties in the predefined relationships and depth determination. The contribution to the uncertainty in pore pressure from the uncertainty in each parameter or in the velocity can be determined, to inform decisions about how best to reduce the uncertainty in the pore pressure estimate. The pore pressure determination may include a correction for reservoir elevation and density differences between reservoir fluids and formation fluids. The determined pore pressure may be used for selection of mud weights for drilling a well while avoiding well cave-in and formation damage, and in designing a casing program.

Another embodiment of the invention is a processor which determines from a velocity obtained from a seismic survey of a subsurface region an estimate of: a formation pore pressure and an uncertainty associated with the estimate of the pore pressure, the uncertainty depending at least in part on an uncertainty in the velocity. The processor may estimate the formation pore pressure by further estimating a density and an effective stress in the subsurface region. The processor may correct the pressure estimate for a range of elevations of a reservoir and density contrasts between a reservoir fluid and the fluid in the adjacent formation. The processor may further determine a maximum and minimum mud weight for drilling a wellbore, and in designing a casing program for drilling.

Another embodiment of the invention is a machine readable medium that includes instructions enabling determination of formation pore pressure and uncertainty in the formation pore pressure from seismic velocities. The medium may be a ROM, an EPROM, an EAROM, a Flash Memory, an Optical disk, a magnetic tape, or a hard drive.

BRIEF DESCRIPTION OF THE DRAWINGS

The file of this patent contains at least one drawing executed in color: Copies of this patent with color drawing(s) will be provided by the Patent and Trademark Office upon request and payment of the necessary fee. The present invention is best understood with reference to the accompanying figures in which like numerals refer to like elements and in which.

DETAILED DESCRIPTION OF THE INVENTION

Figure 1:
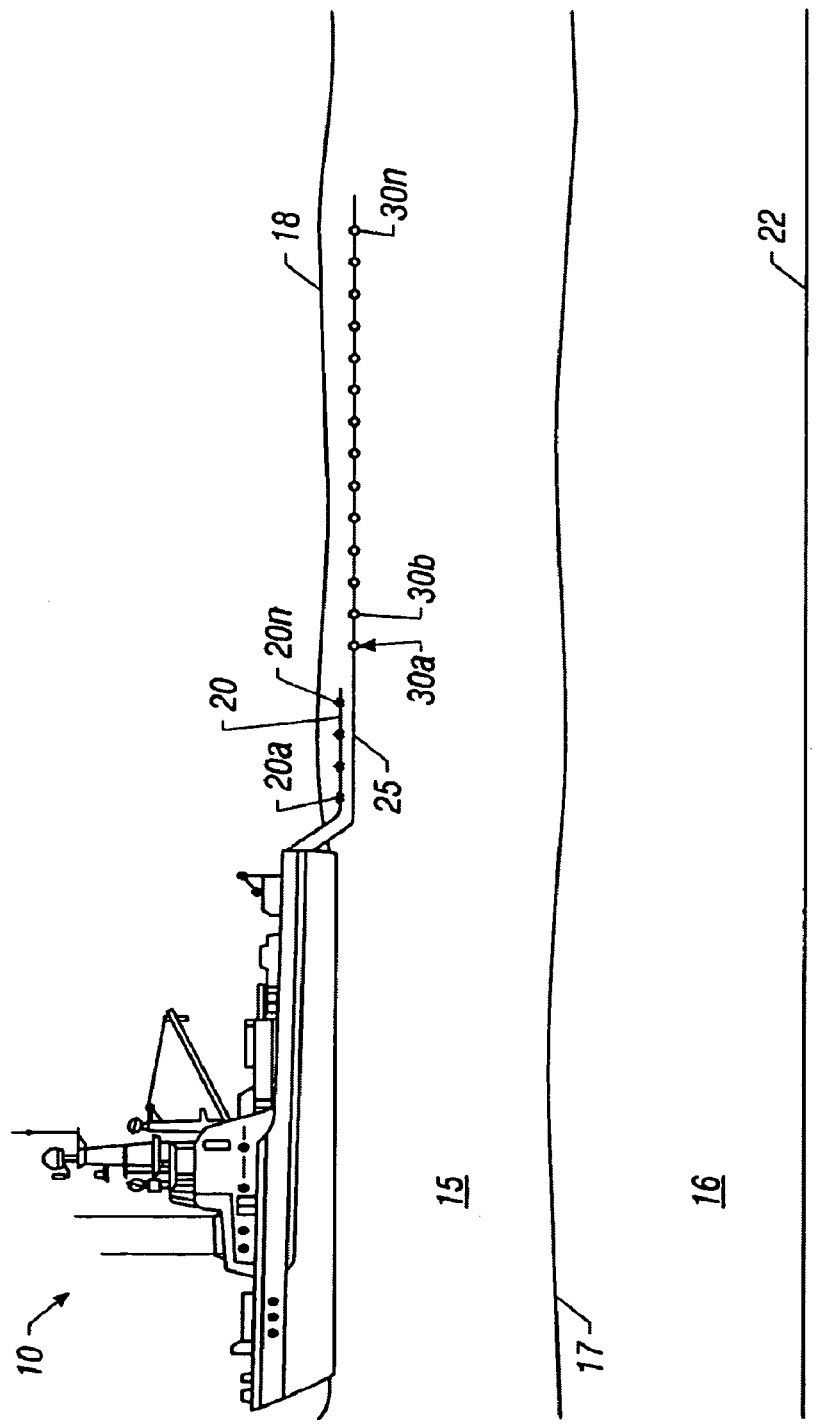
FIG. 1 (Prior Art) illustrates a conventional method of acquisition of marine seismic data.

Referring now to FIG. 1, an example of portions of a marine seismic data acquisition system is illustrated. A vessel 10 on a body of water 15 overlying the earth 16 has deployed behind it a seismic source array 20 and a streamer cable 25. The seismic source array 20 is typically made up of individual air guns 20a, 20b, . . . 20n that are fired under the control a controller (not shown) aboard the vessel 10. Seismic pulses propagate into the earth and are reflected by a reflector 22 therein. For simplifying the illustration, only one reflector is shown: in reality, there would be numerous reflectors, each giving rise to a reflected pulse. After reflection, these pulses travel back to the surface where they are recorded by detectors (hydrophones) 30a, 30b, . . . 30n in the streamer cable. The depth of the source array and the streamer cable are controlled by auxiliary devices (not shown).

In the seismic data acquisition system of FIG. 1, the sources and receivers are in water. As is well-known, water has a shear velocity of zero, so that the seismic signals that would be generated and detected in the water would be pressure signals, and pressure detectors such as hydrophones are used.

Figure 2:
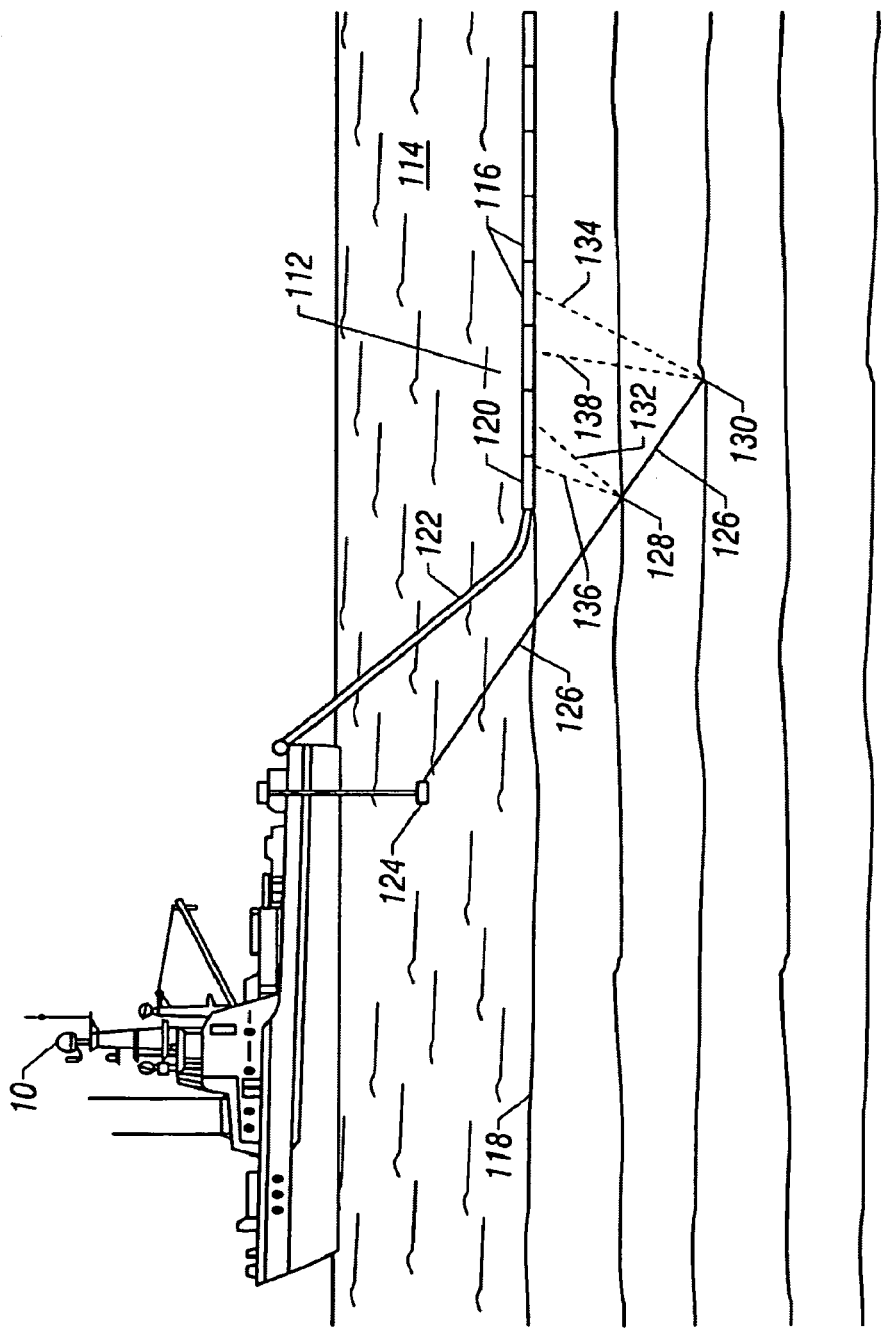
FIG. 2 (Prior Art) illustrates a method of acquisition of marine seismic data using ocean bottom detectors.

Referring to FIG. 2, a seismic exploration vessel 10 is shown deploying a marine cable 112 to seismically explore the substrata beneath the body of water 14. Cable 112 can be quite lengthy, for example a mile (1600 meters) or more, and is normally composed of a number of individual active sections 116 connected end to end. Each section 116 includes a plurality of geophones (motion sensors) and or hydrophones (not shown) and is positioned adjacent to the water bottom 118. Cable 112 can be positioned at the desired location by dragging it to the desired location or by reeling it in and then unreeling it at the desired location as vessel 110 moves forward. Compressional wave energy is provided by an airgun 124 or other suitable source, such as a vibrator. In another commonly used configuration, a plurality of cables are deployed on the ocean floor and subsequent to the deployment of the cables, a seismic source on a vessel is used to excite compressional waves in the water. Another method of deployment does not use cables: instead, the detectors are deployed on pods and provided with a telemetry device for sending data to a recording system.

Also shown on FIG. 2 is a raypath 126 corresponding to compressional wave (P-wave) energy. The ray 126 undergoes reflections at positions 128 and 130 from two different reflecting horizons underneath the water bottom. There are two types of reflected rays for the incident ray 126 at each of the reflection points 128 and 130. The raypaths 132 and 134 correspond to reflected P-waves while the raypaths 136 and 138 correspond to reflected shear waves (S-waves). The reflected P-waves may be easily detected by pressure detectors such as hydrophones on the cable 116. Both P-waves and S-waves may also be detected by using motion detectors, such as geophone, on the cable 116. As would be known to those versed in the art, for recording geometries commonly used in acquisition with a system such as shown in FIG. 2, the P-waves are conveniently detected by a vertical geophone while the S-waves may be detected on a horizontal detector sensitive to inline and crossline motion.

In the present invention, seismic velocities may be derived from any one of many well known prior art methods. These include: one or more of the following:
- stacking velocity data
- coherency inversion velocity data
- pre-stack inversion P-wave velocity
- post-stack inversion P-wave velocity
- pre-stack inversion S-wave velocity
- post-stack inversion S-wave velocity
- shear-wave stacking velocity data
- tomographic P-wave velocities
- tomographic S-wave velocities
- VSP velocity data
- VSP look-ahead inversion
- mode-converted shear wave velocities
- combined Vp and Vs inversion The present invention uses a QRA technique for establishing the uncertainty of a given outcome as a function of the uncertainties in the input parameters affecting the outcome. It has been applied to wellbore stability by a number of authors. See, for example, McClellan et al. As applied to pore pressure prediction, QRA comprises three basic steps: (1) Establishing an appropriate distribution for the values of the parameters used in the equations used and in the input velocity data, (2) performing Monte Carlo simulations in sequence on the transformation equations, (3) quantifying uncertainties in the distribution of the results. The analysis is also used to determine which data and parameters have uncertainties that are large enough to affect the results in a significant way, and which data have small enough uncertainties that it is not necessary to determine them more precisely. This latter information can be extremely useful when prioritizing data collection efforts or in determining what new data need to be collected in order to increase the confidence in the results.

The input parameters may be given by probability distribution functions that may be conveniently described by means of the range of likely values either as percentages or in the input units. The ranges can also be specified either using minimum, maximum, and most likely values of each parameter or using the actual distribution of measured values. Probability distribution functions can be either normal or log-normal curves depending on whether the minimum and maximum values are symmetrical or asymmetrical with respect to the most likely value. In either case, the functional form of the distribution is defined by the assumption that a given percentage of the possible values lie between the maximum and minimum input values.

When a distribution of measured values is provided (for example, when utilizing log data over a finite depth interval), samples can be drawn from the actual distribution. Once the input uncertainties have been specified, Monte Carlo simulations are performed to establish uncertainties in the results. This may be done by using, for example, ten thousand random values of each input parameter generated independently at each analysis depth either by direct sampling of the distribution of the data or using the parameters that define its probability density function.

When computing pore pressure and stress from seismic velocities, the analysis proceeds in two steps. First, the effective stress and density are computed, along with their distributions based on the uncertainties in the input velocities and transforms. Then, the input distributions of effective stress and density are used for calculation of the final overburden and pore pressure. To quantify centroid and buoyancy effects, uncertainties in the reservoir topography and the centroid location and pressure, and in the fluid densities, may be combined in a single analysis step.

Figure 3:
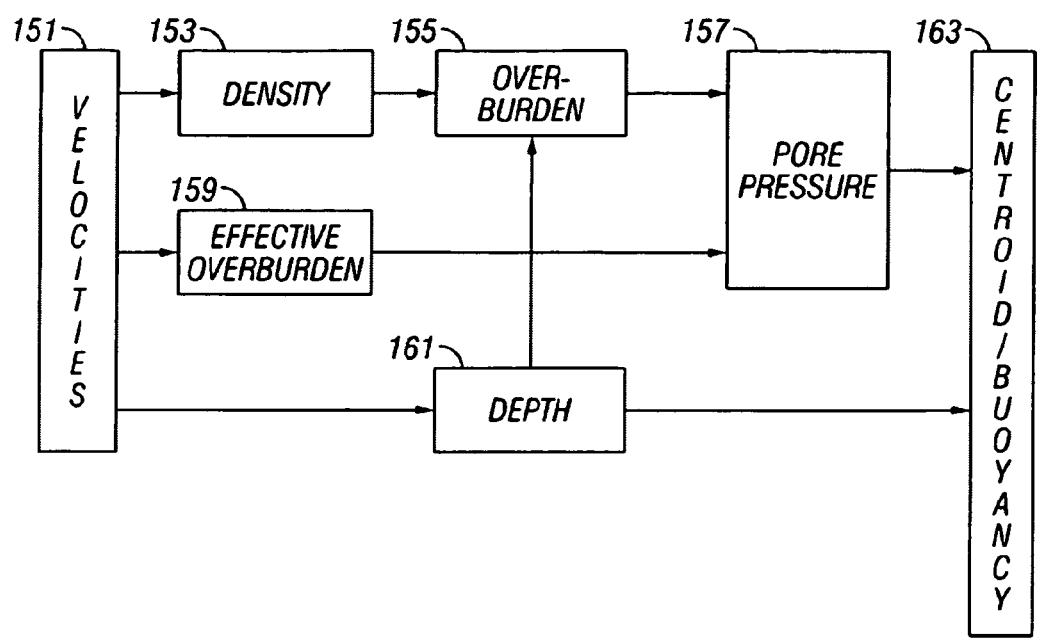
FIG. 3 is a flow chart illustrating some steps of the present invention.

FIG. 3 is a flow chart delineating some of the steps of the present invention. Seismic velocities are obtained 151 using any of the prior art methods identified above. From the seismic velocities, densities are estimated 153 using, for example, a power law relationship of the form:

$$\rho_b = m V_p^n \quad (1)$$

where $\rho_b$ is the bulk density, $V_p$ is the compressional wave velocity, and m and n are fitting parameters. The fitting may be done to log data to derive the fitting parameters in a particular area or may be obtained from other prior knowledge. This is a general case of a relationship from Gardner et al.

The determination of pore pressure is carried out in two steps. First, from the estimated seismic velocities $V_p$, the bulk density $\rho_b$ is calculated using eqn. (1) It should be noted that a similar relation exists for shear velocities, and may be used in the present invention.

From the obtained seismic velocities, a time to depth relationship is determined 161 using any of well known prior art methods. From the time-depth relation and the density estimated at 153, an overburden stress is estimated 155 This may be done by integrating the estimated density over depth (or time). Additionally, from the seismic velocities, an effective stress may be estimated 159. For this, any one of several prior art relations may be used. For example, the Bowers relation:

$$V = V_0 + A\sigma^B \quad (2)$$

where V is the velocity, a is the effective stress, and $V_0$, A, and B are fitting parameters. These fitting parameters may be obtained by calibrating with well information.

Subtracting the effective stress a from the overburden stress from 155 gives the formation pore pressure 157. Other relationships may be used, for example, the pore pressure may be obtained by subtracting the effective stress from the mean stress. Further processing may be done for the centroid/buouyancy effects 163 that are described below.

The present invention addresses several sources of uncertainty. Quantifiable sources of uncertainty include
- uncertainties in the velocities derived from the seismic data,
- uncertainties in the functional form of the transforms between velocities and other parameters such as density that are intermediate results in the analysis
- uncertainties in the parameters used in the transform equations, and
- depth uncertainties from time-to-depth calculations.

Another source of uncertainty in the computations results from a lack of understanding of the mechanism(s) that produce pore pressure anomalies. See, for example, Bowers. These issues have been discussed in numerous papers and symposia. In general, to address this issue it is necessary to identify the mechanism in each case and to apply different transforms to materials subject to different pore pressure generating mechanisms. Thus, these uncertainties are not quantifiable in an absolute sense. Good calibrations, geologic inference, and offset analyses utilizing core and logs are required to identify the domains within which each mechanism acts and to calibrate the relationships between velocity and the other parameters (pore pressure, density, strength, etc . . . ) derived from it. The invention also contemplates the inversion of prestack seismic data to get compressional and shear wave velocities and impedances (and hence densities). The densities may also be derived from gravity data. See, for example, U.S. Pat. No. 6,430,507 to Jorgensen et al. The uncertainties are discussed individually.

Figure 4:
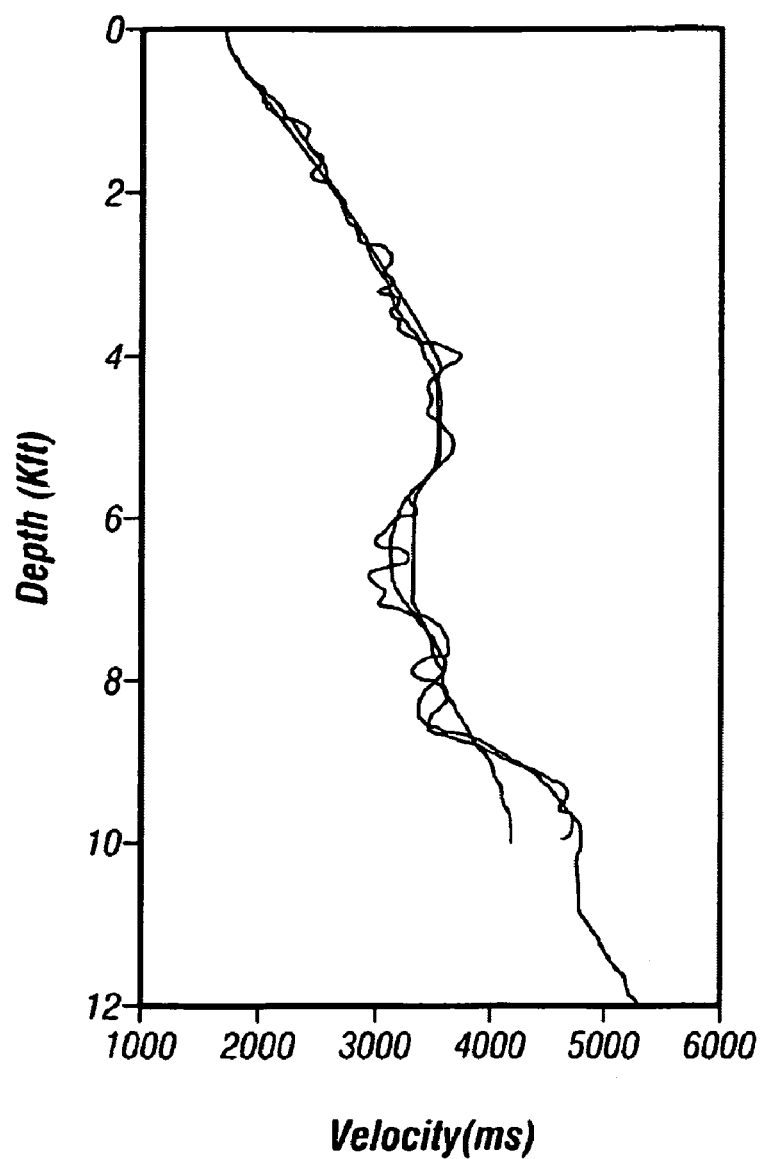
FIG. 4 shows the uncertainty associated with different methods of velocity estimation from seismic data.

Uncertainties in velocity can be due to a number of factors. Because when analyzing reflection data velocities can only be computed at reflecting boundaries, homogeneous shale sections are undersampled by these analyses, resulting in smooth velocity-depth functions that are only correct at discrete and sometimes widely spaced depths. Better analyses derived using velocity inversions provide improved (and sometimes quite different) velocity profiles. A typical set of three different velocity analyses shown in FIG. 4 illustrates that utilization of smooth velocity functions can introduce errors in velocity that are significant (up to 400 m/s in this case, or 10% of the 4000 m/s velocity at 2.5 km). Note that this uncertainty is inherent in the velocity estimation process, in contrast with the method of Liang where the velocities are assumed to be correct. It is also to be noted that while Sayers does discuss different methods of velocity determination giving different estimates, the teachings are limited to simply selecting one of many methods, not of getting a quantitative estimate of uncertainty. These types of uncertainties are inevitable unless high-resolution velocity inversions are used to derive the input velocity field utilized for pore pressure analysis.

Figure 5:
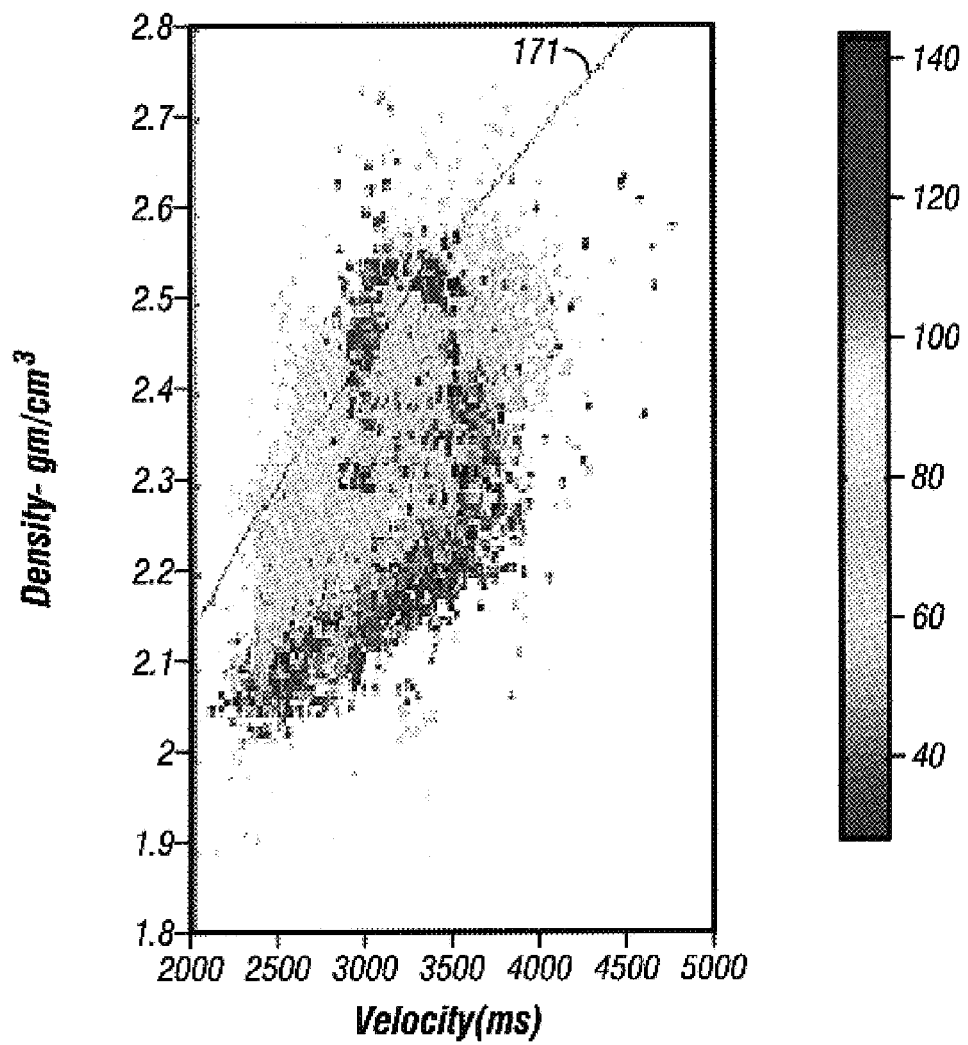
FIG. 5 (in color) is a cross-plot showing velocity vs. density derived from an offset well.

Uncertainties in the form and parameter values of transforms from velocity to density (eqn. 2), effective stress (eqn. 3), or other required data can contribute large amounts of uncertainty to the results. Of particular concern is uncertainty in density-velocity transforms. FIG. 5 shows data from an offset well that was used to derive a velocity-density transform for analysis of a 3-D seismic velocity cube in the Gulf of Mexico. There is a large apparent scatter in the data, however it is clear that much of the variation in density for a given velocity is associated with variations in gamma ray readings. Color indicates GR (hotter colors are higher GR). Even sampling only the high gamma materials, there is considerable uncertainty in the functional form In this material, increased gamma ray was due to an increase in clay content and a decrease in sorting, which resulted in a reduction in porosity. Unfortunately, it is not possible using velocities alone to compute an independent porosity value, and thus for the purpose of analysis of seismic data this variation can be quantified only in terms of uncertainties in the parameters used to fit a relationship between velocity and density. While it is well known that the relationship between density and velocity is poorly described by a single curve, the largest sources of error occur at the lowest velocity. When necessary, multiple relationships, varying with depth and position, are used to reduce the impact of this problem, and when a single relationship is chosen the uncertainties are adjusted to compensate. Standard statistical analysis, such as that provided by SPSS, may be used.

Regardless of whether the density data shown in FIG. 5 are fit to a power law, a linear relationship, or a second-order polynomial, the goodness of fit is essentially the same. The precise functional form of the transform appears to be unimportant. What is important is that the uncertainty in the transform result is recognized and handled in a meaningful way. Even sampling only the high gamma materials, there is considerable uncertainty in the functional form (let alone the best fit of a given function) to the data to compute density from velocity. The line 171 shows an 2nd order polynomial fit to all points with gamma ray readings above 90 API units.

Uncertainties in effective stress-velocity relationships are handled in the same way, and as in the case of density-velocity relationships. Uncertainties in the mechanisms can be estimated but not quantified without further analyses. Uncertainties in depth derived from time-depth conversion can also affect the final calculated pore pressure profile. This is because the final depths will be uncertain. Additionally, the determination of overburden depends on accurate depths, as does derivation of equivalent gradients. Corrections for differences between velocities measured in calibration wells compared to local seismic velocities can be made during the calibration step, and if desired the distribution of uncertainty can be adjusted to account for such issues as anisotropy, upscaling, and dispersion. In such cases a non-symmetric distribution is more appropriate than one that is symmetric about the measured velocity.

Figure 6A:
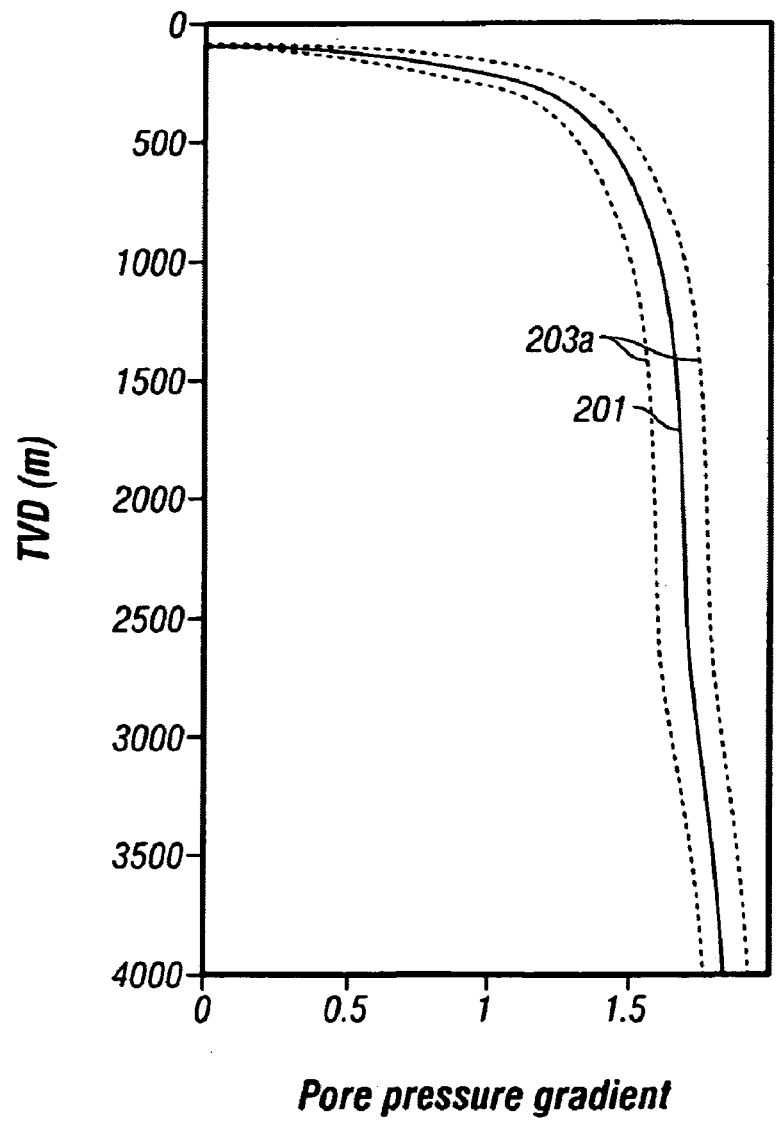
FIGS. 6a and 6b are plots of pore pressure gradient and 90% confidence limits (a) assuming 5% uncertainty in the velocities, and (b) assuming 10% uncertainty in the velocities.
Figure 6B:
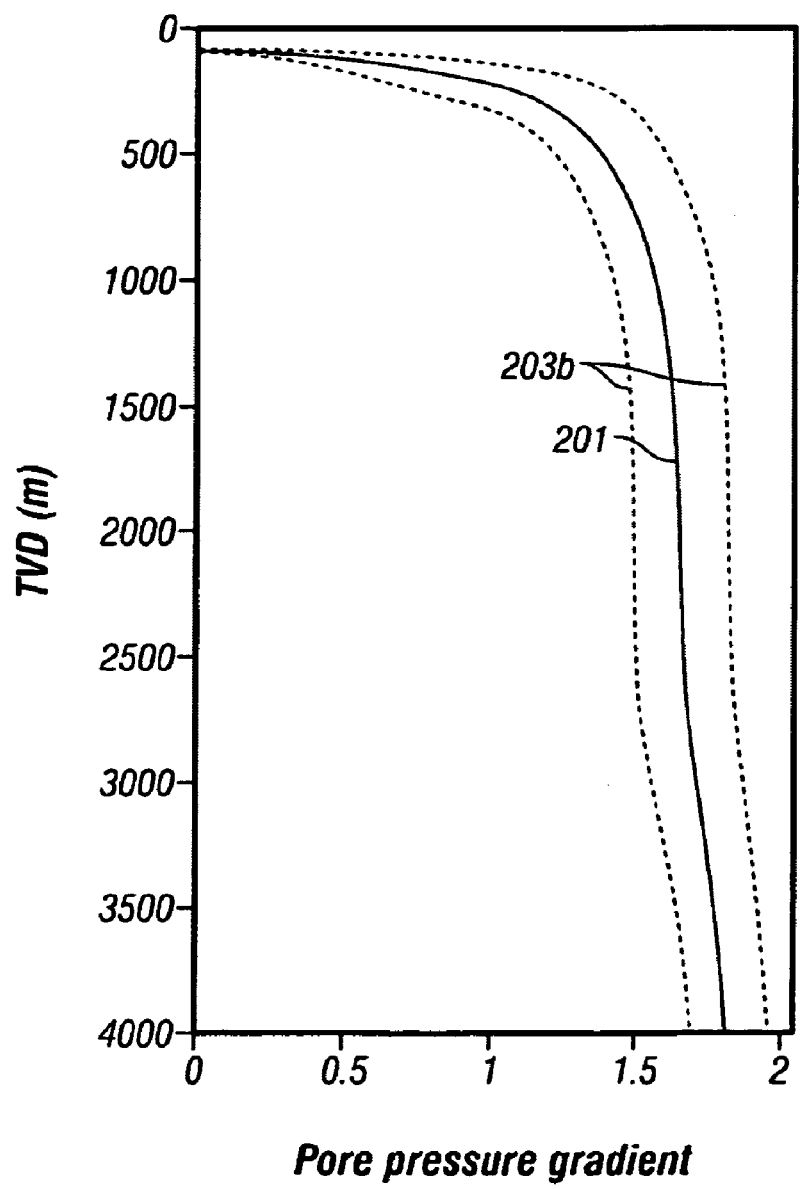

The output results may be displayed either as depth plots of the most likely value and of values lying a given number of standard deviations around the most likely value. An example of such a display is given in FIG. 6a and 6b. Shown is a plot of true vertical depth (TVD) as the ordinate against pore pressure (abscissa). 201 is the estimated pore pressure gradient (PPG), 203a in FIG. 6a is the estimated uncertainty bound in PPG assuming a 5% error in estimation of seismic velocities, and 203b in FIG. 6b is the estimated uncertainty bound in PPG for a 10% error in estimation of seismic velocities.

Figure 7:
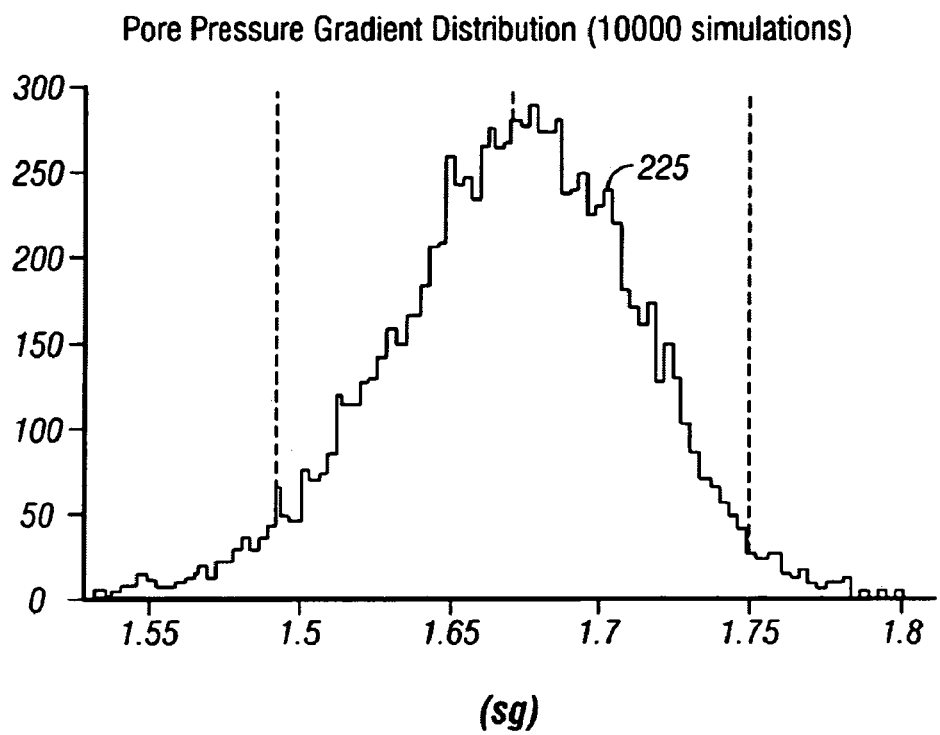
FIG. 7 is a histogram of predicted pore pressure at a depth of 3000 m assuming a 5% uncertainty in velocity estimation.

Another display that may be produced in the invention is the histogram of PPG shown in FIG. 7. Shown in FIG. 7 is a probability distribution 226 of pore pressure at a single exemplary depth 3000 ft (914 m) TVD. Another display that may be obtained is a cumulative distribution functions of the likelihood of a given outcome (for example, that the pore pressure is below a certain pressure). Plots of percentile distributions may also be obtained.

Figure 8:
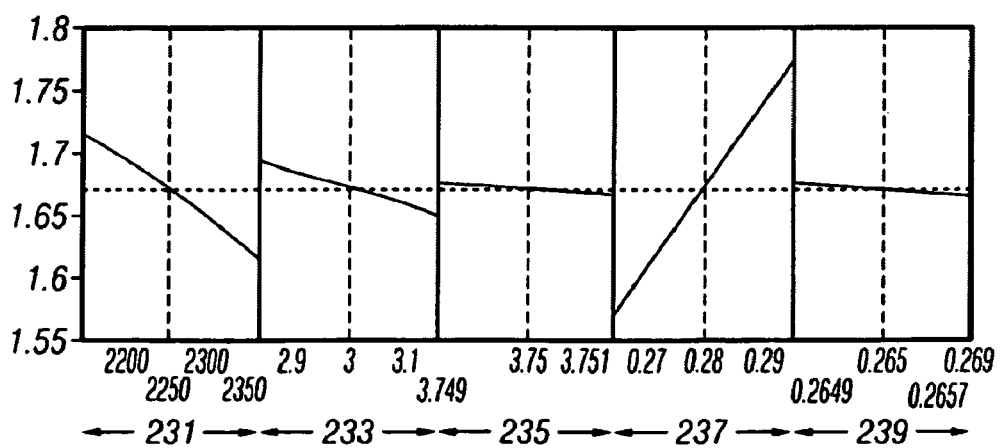
FIG. 8 shows the sensitivity of estimated pore pressure to velocity and fitting parameters of the velocity density relationship.

Another display that may be produced in the invention is a sensitivity analysis of the predicted pore pressure to different sources of uncertainty. This is shown in FIG. 8. The sensitivity of the results to each of the uncertain inputs can also be displayed to identify those parameters with the greatest influence. In FIG. 8, curve 231 is the sensitivity of the pore pressure estimate to the obtained seismic velocity, 233 and 235 are the sensitivities of the pore pressure to parameters such as A and B in eqn. (2), and 237 and 239 are the sensitivities of the pore pressure to the parameters m and n respectively. In one embodiment of the invention, the parameter $V_0$ in eqn. (2) may be fixed.

Referring back to FIG. 3, we discuss further optional aspects of the invention. This has to do with centroid/buoyancy effects. This effect has been discussed in Onyia and is summarized here.

Figure 9A:
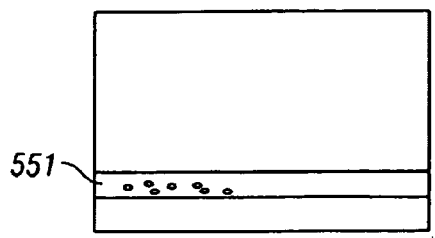
FIGS. 9a-9c (prior art) illustrate overpressuring that may occur in a thin sand body as a result of rapid burial.
Figure 9B:
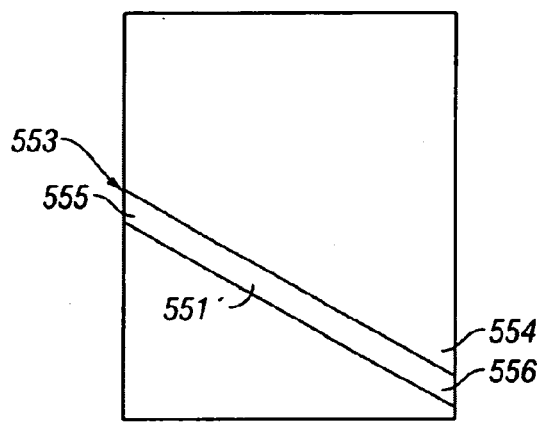
Figure 9C:
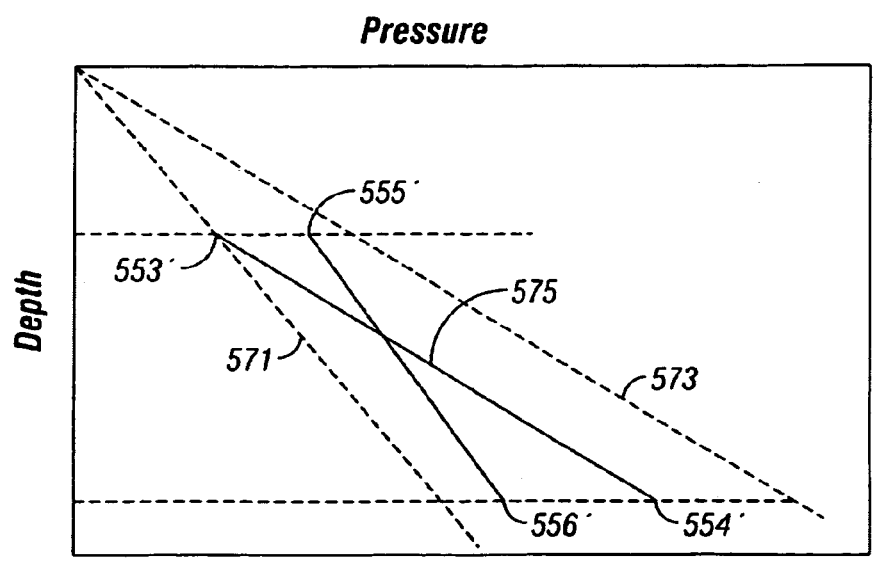

An isolated sand layer within a thick shale that is subjected to rapid burial may have very unusual stress configurations. This is illustrated in FIGS. 9a-9c. Consider a sand body 551 as shown in FIG. 9a that is initially in a horizontal position and then due to rapid burial at the right end, assumes the configuration shown by 551' in FIG. 9b. Consider now the relative pressures between the sand and the shale at the shallow end (points 555, 553) and the deep end (points 556, 554). Normal hydrostatic and lithostatic stress distributions are indicated in FIG. 19c by 571 and 573 respectively. The shale 553 at the shallow end is essentially at hydrostatic pressure given by the point 553' while the shale at the deep end 554 is at an abnormally high pressure denoted by the point 554'. (If the subsidence is rapid enough, the shale pressure follows a stress line 575 parallel to the lithostatic line 573). The sand at the deep end will now be at a pressure denoted by 556' but due to the good permeability of the sand, the pressure gradient within the sand will be substantially hydrostatic and the shallow end of the sand will now be at a pressure denoted by 555'. As a result of this, the stress in the sand is greater than the stress in the adjoining shale and, if the difference is large enough, this can lead to a breakdown of any possible sealing strength of the sand-shale interface and any hydrocarbons that may be present in the sand will leak out. A probability analysis of such reservoirs is part of the present invention.

Figure 10:
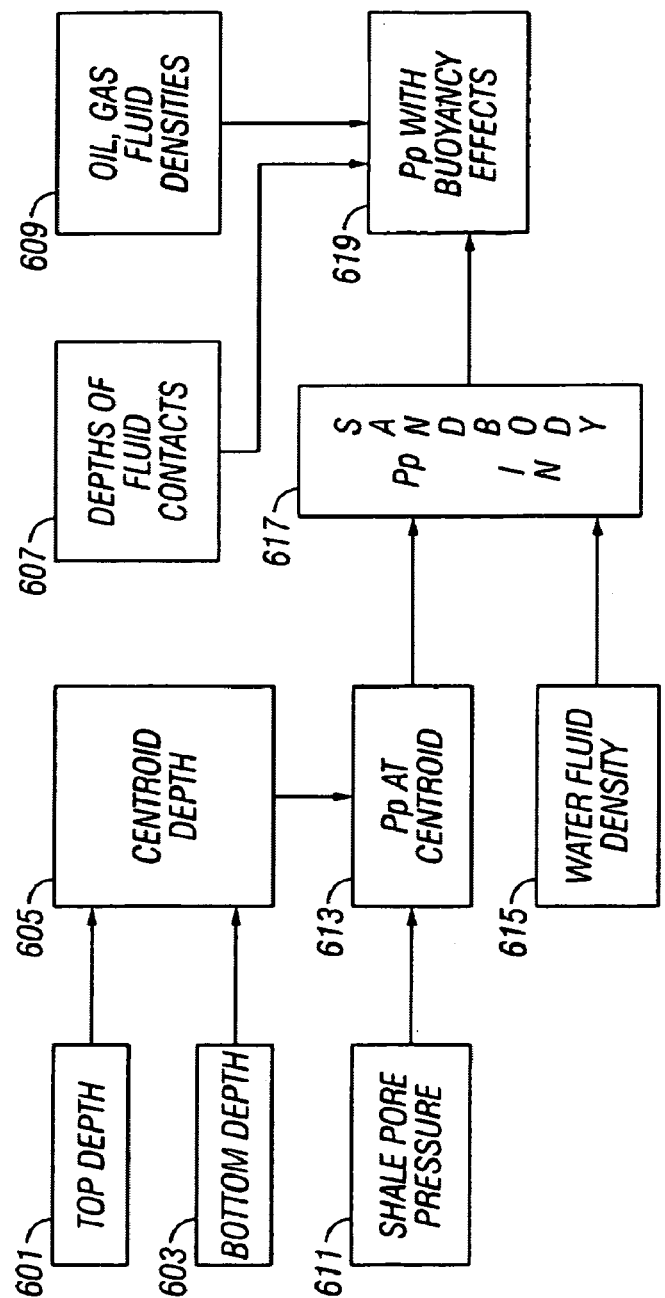
FIG. 10 shows the steps involved in the centroid/buoyancy calculations.

Referring now to FIG. 10, steps involved in determining the centroid and buoyancy effects (163 in FIG. 3) are depicted. The top 601 and bottom 603 depths of the reservoir are determined from seismic data (using seismic travel times and velocities). From these, the centroid depth 605 for the reservoir is determined. From knowledge of the shale pore pressure 611 as a function of depth, the pore pressure at the centroid depth is determined 613. From the pore pressure in the shale at the centroid depth and water density, the pore pressure in the sand body is calculated 617. The pore pressure with buoyancy effects is then calculated 619 using the pore pressure in the sand 617, the depth of the fluid contact 607 and the density of reservoir fluids (water, oil and/or gas) 609, the buoyancy effect being related to the difference between the density of water and the oil/gas density. Multiple fluid contacts may also occur.

The factors that are uncertain in the centroid calculations include the centroid depth, the depths of crest and trough, the assumed position of the centroid relative to the crest and trough, and the shale pressure at centroid depth. All of these factors may be considered in the uncertainty analysis.

The factors that are uncertain in the buoyancy calculations include fluid densities, the contact positions, and the centroid pressure. These too may be considered in the uncertainty analysis.

Figure 11:
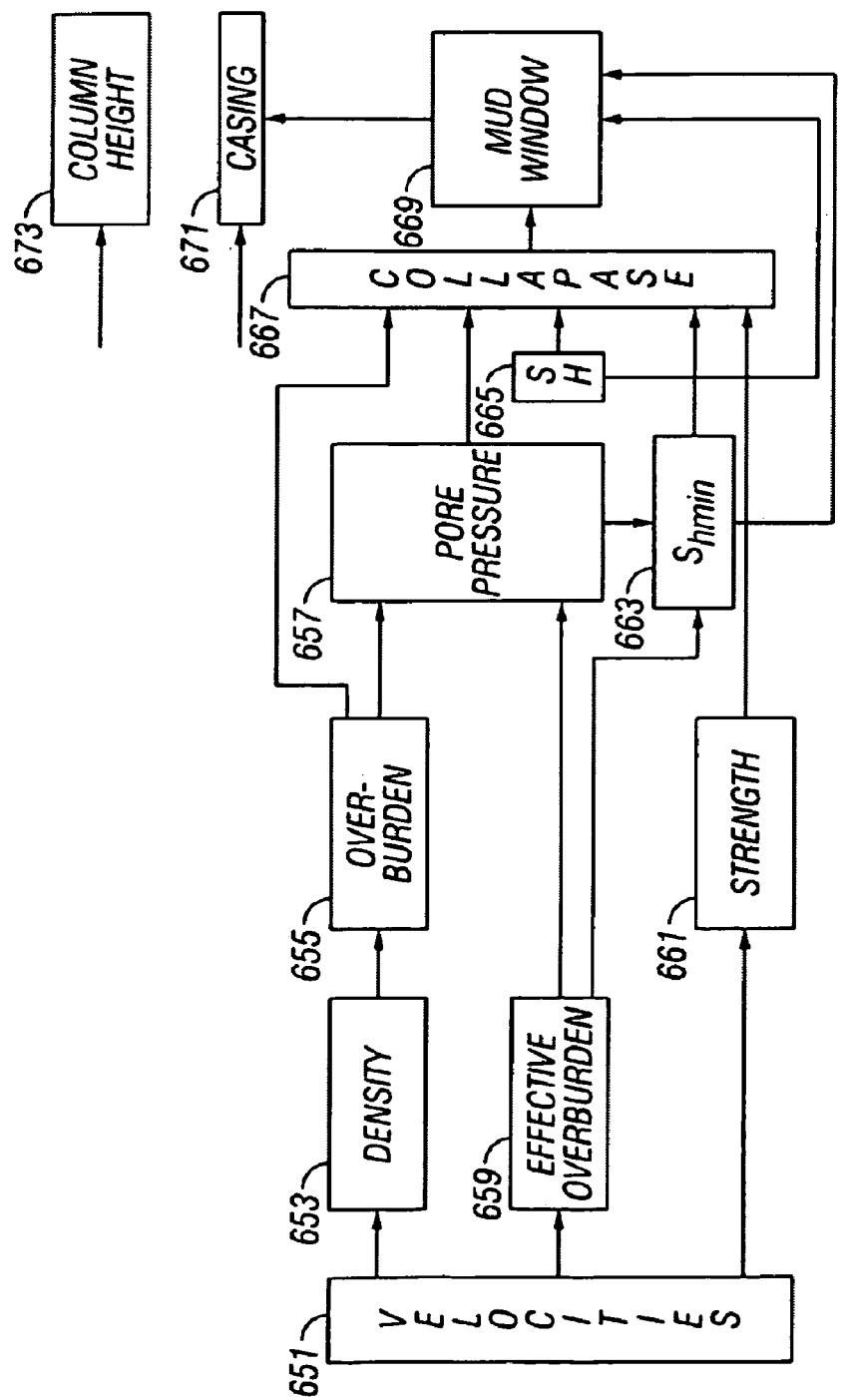
FIG. 11 is a flow chart showing steps involved in determination of a mud window.

Another embodiment of the invention utilizes fundamental geomechanics principles to constrain possible hydrocarbon column heights and to estimate the safe upper and lower bounds for mud weights used in drilling. The maximum possible height of a hydrocarbon column is controlled by the pressure difference between the pore pressure in the reservoir and the pressure above which the top of the column will breach its seal. If pressure seals are controlled by the stress state and not by capillary effects or permeability thresholds, then knowledge of the stresses allows determination of the sealing pressure of the rock. Two mechanisms for seal leakage that are controlled by the stresses are the pressure required to propagate a hydrofracture, which is equal to the least principal stress (S3), and the pressure above which faults will slip, enhancing their permeability, which can be found from relationships such as:

$$f(\mu) = \frac{(S_1 - P_p)}{(S_3 - P_p)}. \quad (4)$$

where $\mu$ is the coefficient of sliding friction on a well-oriented fault and $S_1$ and $S_3$ are the greatest and least principal stresses. Such relationships have been disclosed in U.S. Pat. No. 4,635,719 to Zoback et al. The value of the pore pressure $P_p$ above which the right-hand side of Eqn. (4) is greater than the left-hand side is the leakage pressure; this is lower than the pressure required to propagate a hydraulic fracture The concepts for this are illustrated in the flow chart of FIG. 11. Starting with the seismic velocities 651, density 653 and effective stress 659 are calculated as discussed above with reference to FIG. 3. The density 653 is integrated to give the overburden 655 and, using the effective stress 659, the pore pressure 657 is calculated. Not shown in FIG. 11 is the optional centroid/buoyancy calculations as discussed above with respect to FIG. 10. Rock strength is estimated 661 from velocity using prior art methods. See, for example, Horsrud.

The determining factor from a geomechanics standpoint in mud weight selection is the ability to maintain a finite mud window between the minimum safe effective mud weight and the maximum safe effective mud weight, over the entire open hole interval. The minimum safe mud weight for the mud window 669 is controlled by the pore pressure where the rock is strong.

Where the rock is weak, wellbore stability is an issue, and the minimum safe mud weight must be the larger of the pore pressure 657 and the collapse pressure 667, defined as the internal wellbore pressure below which the rock around the well is so unstable that it prevents further drilling. The collapse pressure 667 is controlled by the rock strength 661, the stress magnitudes 663, 665, overburden 655 and the orientation of the well with respect to the stress field.

The upper bound on the mud window is the lost circulation pressure, which can be any one of (i) the fracture initiation pressure, (ii) the fracture link-up pressure, and (iii) the fracture propagation pressure. Although it can be increased using appropriate mud formulations, the safest assumption is that the latter is limited by the least principal stress $S_{hmin}$ 663. The fracture initiation and linkup pressures are controlled by the in situ stress state and the wellbore orientation Still referring to FIG. 11, the column height constraints can be used as a first pass estimate of the volume of hydrocarbons in risk-based reservoir evaluation.

In combination with the uncertainty analysis, the mud weight constraints represent significant improvements in previous methods that utilized pore pressure and fracture gradient alone. This is not only because they allow computation of mud windows for wells of any orientation (although this requires information about stress orientation in addition to all three principal stresses), but also because they provide quantitative estimates of the influence of uncertainties in the input velocities, and in the velocity transforms, on the final well design.

If there are thin sands present in the earth formation that are below the limits of seismic resolution, this method will reduce the likelihood of problems occurring when the drill-bit penetrates the sands.

Figure 12:
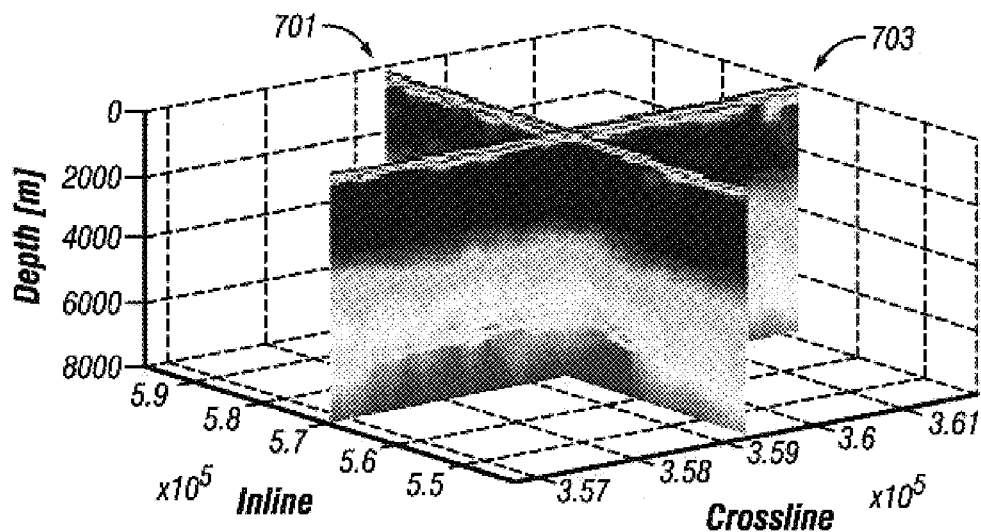
FIG. 12 (in color) shows a Pore pressure cube with centroid effects.
Figure 13:
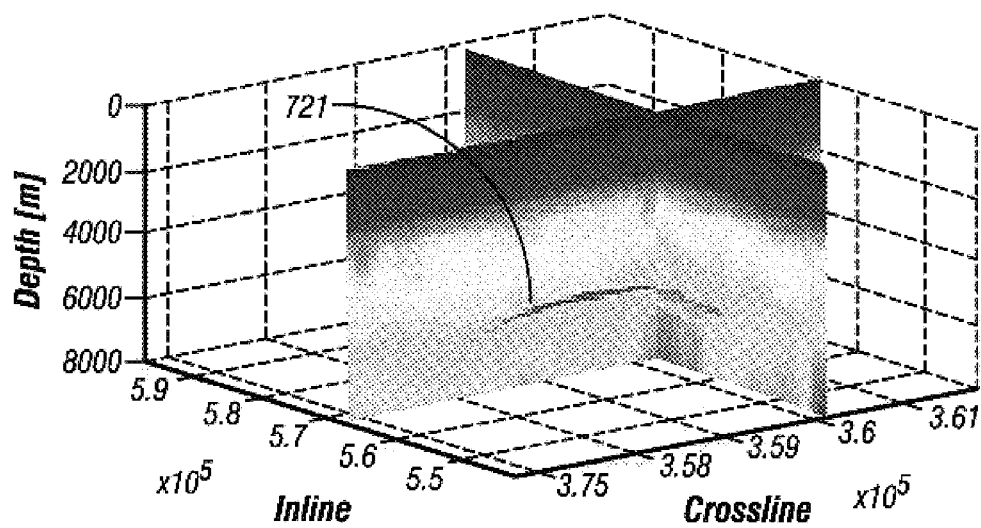
FIG. 13 (in color) is a display of hydrocarbon column heights assuming possible breaching of seals.

We next present examples of the method of determination of column height, mud window and casing selection. FIG. 12 shows two slices 701, 703 through a pore pressure cube containing three stacked reservoirs. The uppermost reservoir 721 is labeled and has significant topography, leading to very high pore pressures at its crest relative to the pore pressure in the surrounding shale. The other two reservoirs are not visible in the figure and are not labeled. As shown in FIG. 13, the hydrocarbon column height at the crest of this reservoir is very small due to the small difference between the reservoir pressure and the pressure required to breach the overlying shale, which is controlled by the much lower shale pore pressure and resultant stresses. Thus this uppermost reservoir is not expected to hold significant hydrocarbons. However, the two underlying reservoirs are attractive targets for drilling.

Figure 14:
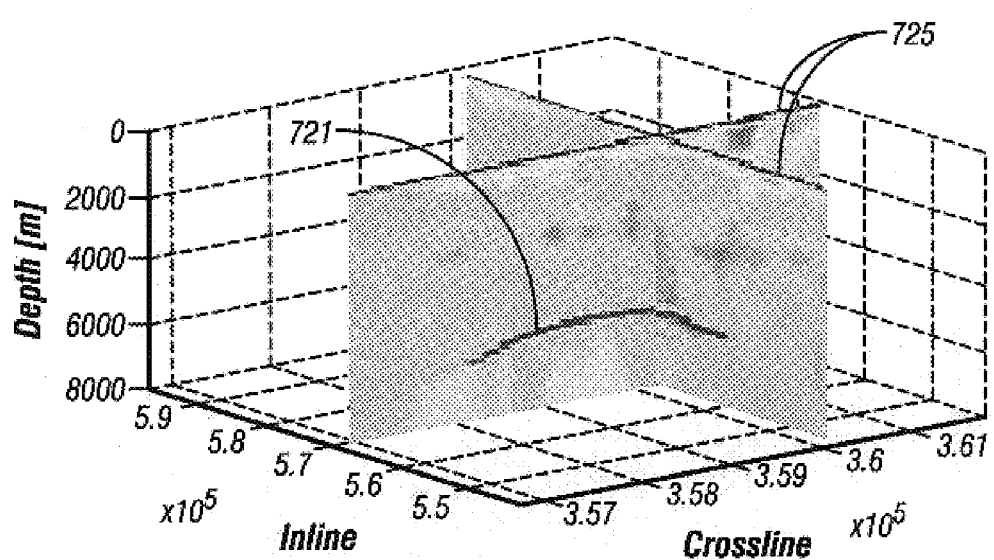
FIG. 14 (in color) shows the mud window determined for a vertical well.

The lower two reservoirs not visible in FIGS. 12 and 13 are promising targets for exploitation. However, to reach these reservoirs it is necessary to drill through the overlying overpressured sand. FIG. 14 shows the mud window computed from the velocity data. The window ranges from near zero within the uppermost reservoir 721 (red color), to more than 0.4 SG (blue colors) where the overlying shales are normally pressured. The narrow mud window near the sea floor 725 is a consequence of the very weak rock, and the very small difference between pore pressure and lost circulation pressure. Where the pore pressure is hydrostatic at greater depths, the mud window is quite large. However, elevated pore pressures cause a decrease in the mud window at greater depths. The uppermost reservoir, which has very high pore pressure near its crest due to centroid effects, also has no difference between the minimum safe mud weight and the maximum safe mud weight. This is because (1) the pore pressure and the least stress are nearly equal, and (2) the high pore pressure leads to a decrease in rock strength, because the reservoir is both highly porous, which reduces its intrinsic strength, and under very low confining stress.

Figure 15:
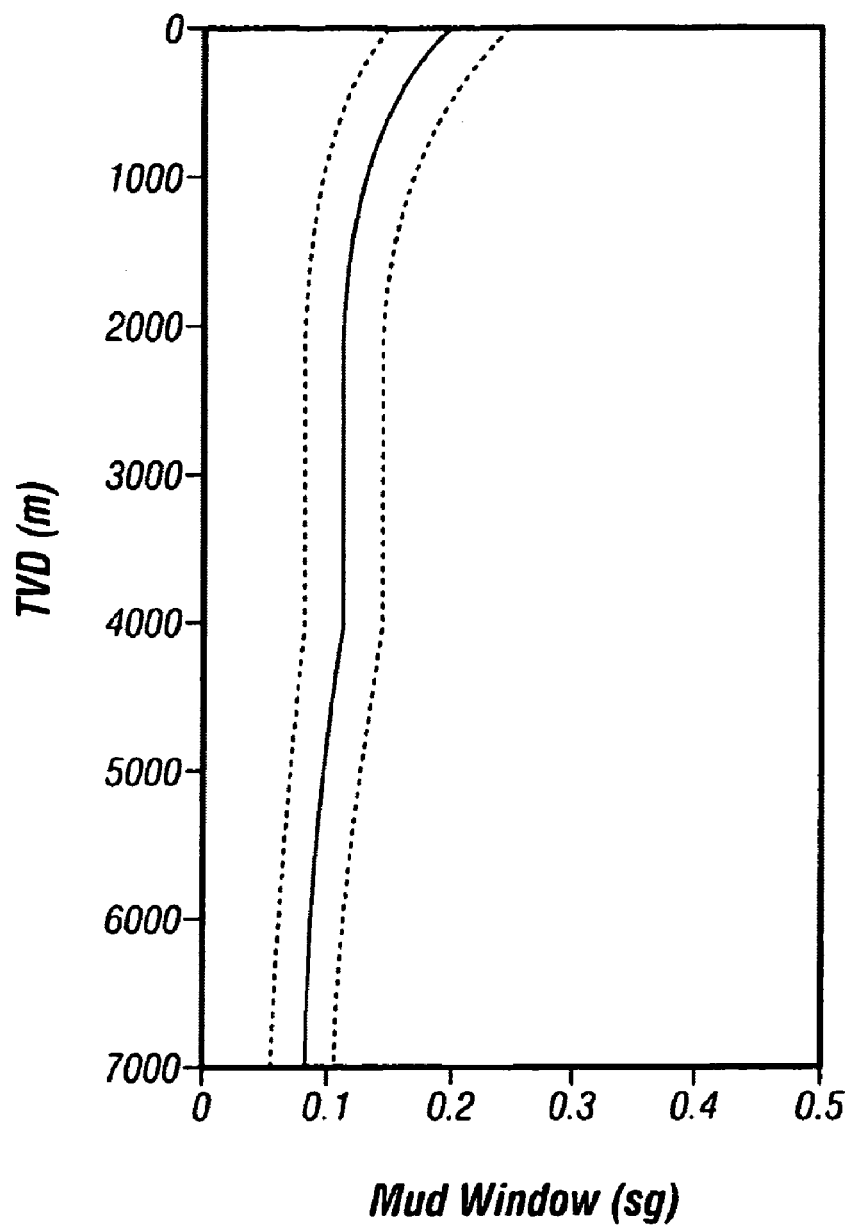
FIG. 15 is a mud window profile (without centroid calculations) within the uppermost 7000 m for a well near the crest of the sands of FIG. 12.

As discussed above, there is considerable uncertainty in the computation of the pore pressure. Thus, the mud window also has large uncertainties. FIG. 15 shows a plot of mud window as a function of depth in the shales only (ignoring the effects of centroid and buoyancy in the sands). The combined uncertainties in the rock strength, the pore pressure, and the total stresses lead to a mud window uncertainty of ±0.025 SG. This uncertainty can be incorporated into estimates of the risk of drilling during the design stage of specific wells See, for example, Van Oort et al.

Figure 16:
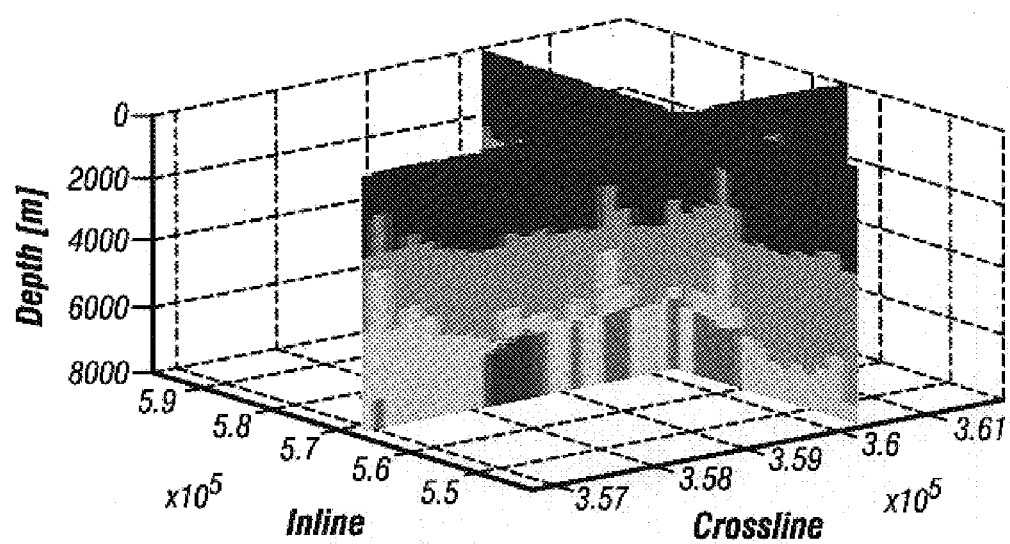
FIG. 16 (in color) is a display showing the relative number of casings for wells at different locations.

It is possible, using the mud window derived from the seismic analysis, to estimate the number of casings required for wells with arbitrary orientations drilled into the field. As an illustration, FIG. 16 shows an estimate of the number of required casings to reach any given depth of a vertical well. In deriving this image we assume that within each cased interval a finite difference must be maintained between the minimum safe mud weight where the mud weight is largest, and the maximum safe mud weight where it is smallest, within the entire exposed interval. The actual number of casings and their precise positions can only be estimated, given the degree of uncertainty indicated in FIG. 15. However, several things are clear. First, the onset of shallow overpressure requires shallower intermediate casing set points. The different required setting depths can be quite significant. Second, one or two additional casings are required for nearly all wells that penetrate the over pressured sand. However, what is interesting is that there appear to be windows where the pore pressure and stress profiles may allow drilling with fewer casings. Thus, while the number of casings and their precise set points should not be defined solely on the basis of this data, it does indicate that well placement should be carefully considered with an eye towards optimizing casing designs for wells drilled to exploit the deeper reservoirs.

Figure 17:
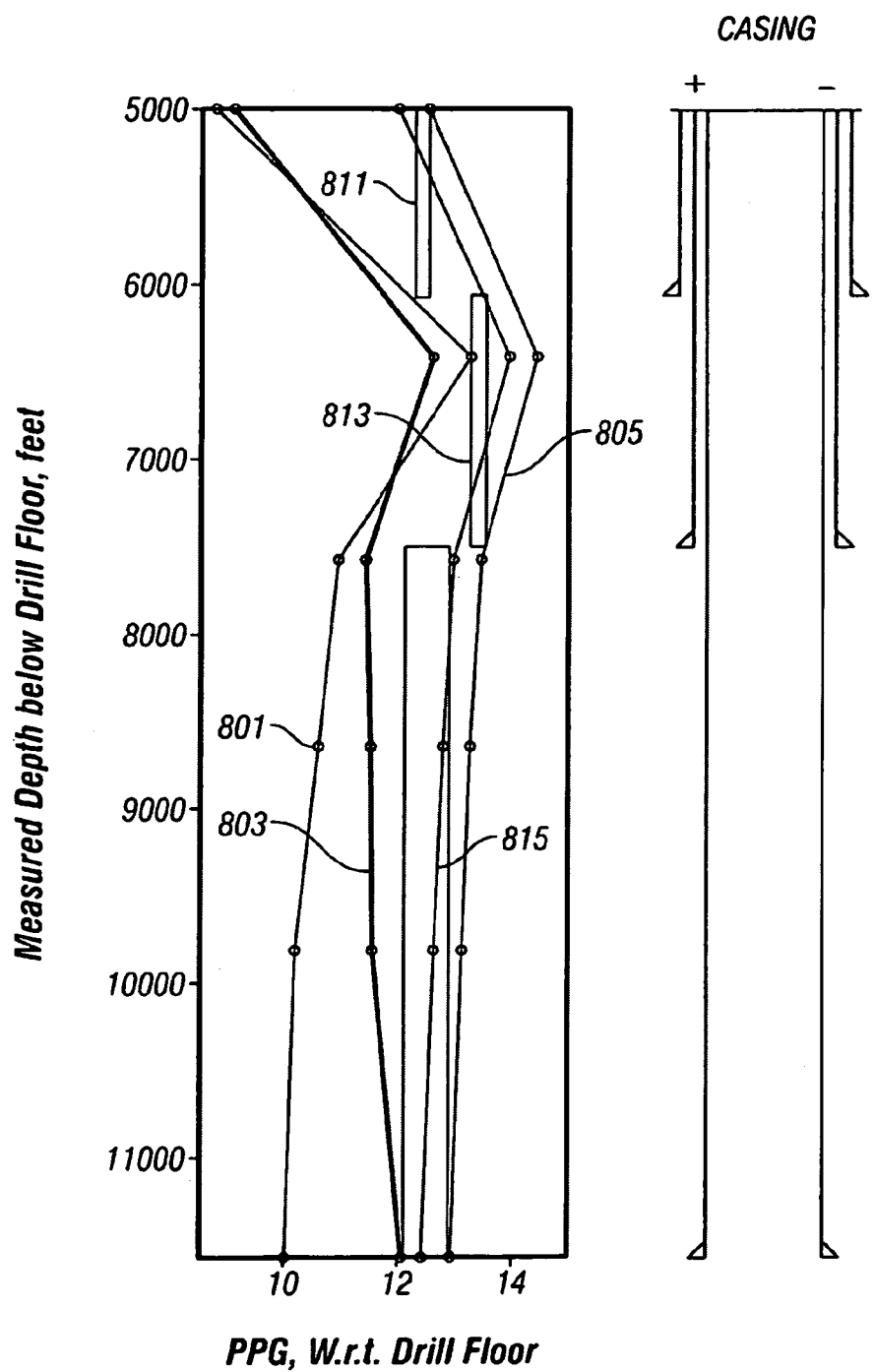
FIG. 17 illustrates use of the method of the present invention in casing selection.

An example of casing design is shown in FIG. 17. Illustrated is a selected depth interval where 801 is the estimated pore pressure from seismic velocities, 803 is the collapse pressure, and 805 is the fracture gradient which cannot be exceeded. For such a situation, the casing design with casing sections 811, 813 and 815 satisfy the requirements for wellbore stability discussed above.

The processing of the data to apply the various corrections may be accomplished in whole or in part by a suitable processor. Implicit in the processing of the data is the use of a computer program implemented on a suitable machine readable medium that enables the processor to perform the control and processing. The machine readable medium may include ROMs, EPROMs, EAROMs, Flash Memories, Optical disks, magnetic tapes and hard drives.

While the foregoing disclosure is directed to the preferred embodiments of the invention, various modifications will be apparent to those skilled in the art. It is intended that all variations within the scope and spirit of the appended claims be embraced by the foregoing disclosure.

What is claimed is:

1. A method for determining a property of a subsurface region of an earth formation, the method comprising:
    (a) obtaining a velocity of the subsurface region from a seismic survey;
    (b) estimating from the obtained velocity:
        (A) a formation pore pressure of the subsurface region using a density estimated using the velocity and an effective stress of the subsurface region estimated using the velocity, and
        (B) an uncertainty associated with the estimated pore pressure of the subsurface region, said uncertainty depending at least in part on an uncertainty in the obtained velocity; and
    (c) using the determined formation pore pressure for establishing a minimum and maximum mud weight used in drilling a borehole in the earth formation based on at least one of:
        (i) the pore pressure of the subsurface region;
        (ii) a strength of a rock constituting the subsurface region;
        (iii) a maximum principal stress in the subsurface region;
        (iv) a minimum principal stress in the subsurface region; and
        (v) a collapse pressure that prevents drilling.

2. The method of claim 1 wherein estimating the formation pore pressure comprises using a relationship of the form:

$$P_p = P_o - P_e$$

wherein $P_p$ is the formation pore pressure, $P_0$ is an overburden stress estimated from the density, and $P_e$ is an effective stress.

3. The method of claim 1 wherein estimating the density further comprises using a first predefined relation between the velocity and the density.

4. The method of claim 1 wherein estimating the effective stress further comprises using a second predefined relation between the velocity and the effective stress.

5. The method of claim 1 wherein the estimate of uncertainty associated with the pore pressure is further dependent upon an uncertainty in at least one parameter selected from the group consisting of (i) a parameter of a relationship between the velocity and the density, (ii) a parameter of a relationship between the velocity and the effective stress, and (iii) a depth estimate from the velocity.

6. The method of claim 5 further comprising identifying the at least one parameter that causes the greatest uncertainty in the estimate of pore pressure.

7. The method of claim 1 wherein estimating the uncertainty associated with the estimate of pore pressure further comprises defining a probability density function characterizing the seismic velocity.

8. The method of claim 7 wherein estimating the uncertainty associated with the estimate of pore pressure further comprises performing a Monte Carlo simulation based on at least one of (i) direct sampling of a distribution of data, and (ii) parameters that define a probability density function.

9. The method of claim 1 wherein the subsurface region comprises a substantially impermeable formation overlying a permeable formation, and wherein estimating the pore pressure in the permeable formation further comprises correcting for:
 (i) a range of elevations of the permeable formation, and
 (ii) densities of the fluids in the permeable formation.

10. The method of claim 9 wherein the impermeable formation comprises a shale.

11. The method of claim 9 further comprising determining from the determined formation pore pressure a maximum possible height of a hydrocarbon column in the permeable formation.

12. The method of claim 9 further comprising drilling the borehole by selecting a mud weight to avoid drilling problems in a thin porous layer within the impermeable formation.

13. The method of claim 9 further comprising completing the borehole by determining a number of casing segments needed to drill to a specified depth within the subsurface region.

14. The method of claim 1 further comprising determining a maximum possible height of a hydrocarbon column in the subsurface region.

15. The method of claim 1 further comprising completing the borehole by determining a number of casing segments needed to drill to a specified depth within the subsurface region.

16. The method of claim 1 wherein the velocity is a result of at least one of:
 (i) normal moveout analysis, (ii) coherency inversion, (iii) pre-stack inversion of P-wave data, (iv) post-stack inversion of P-wave data, (v) pre-stack inversion of S-wave data, (vi) post-stack inversion of S-wave data. NMO analysis of shear-wave data, (viii) tomographic analysis of P-wave data, (ix) tomographic analysis of S-wave data, and (x) analysis of VSP data.

17. The method of claim 1 further comprising measuring the velocity of the subsurface region.

18. A processor configured to determine from a velocity measured using a seismic survey of a subsurface region of an earth formation an estimate of:
 (a) a formation pore pressure of the earth formation using an estimated density derived from the velocity and an estimated effective stress derived from the velocity;
 (b) an uncertainty associated with the estimate of the pore pressure of the subsurface region, the uncertainty depending at least in part on an uncertainty in the velocity; and
 (c) conducting additional drilling operations based on the estimated pore pressure and the uncertainty in the estimate of the pore pressure.

19. The processor of claim 18 wherein the processor is configured to estimate the formation pore pressure by further estimating a density and an effective stress in the subsurface region.

20. The processor of claim 18 wherein the subsurface region comprises a substantially impermeable formation overlying a permeable formation, and wherein the processor is configured to estimate the formation pore pressure by further correcting for:
 (i) a range of elevations of the reservoir or other permeable formation, and
 (ii) densities of fluids in the permeable formation.

21. The method of claim 18 wherein the impermeable formation comprises a shale.

22. The processor of claim 18 wherein the additional drilling operations are based at least in part on a maximum possible height of a hydrocarbon column in the reservoir or other permeable formation determined by the processor using the estimated pore pressure.

23. The processor of claim 18 wherein the additional drilling operations are conducted using a minimum and maximum mud weight determined by the processor from at least one of:
 (i) the pore pressure of the subsurface region;
 (ii) a strength of a rock constituting the reservoir;
 (iii) a maximum principal stress in the subsurface region;
 (iv) a minimum principal stress in the subsurface region; and
 (v) a collapse pressure that prevents drilling.

24. The processor of claim 18 wherein the additional drilling operations include selection of a number of casing segments needed to drill to a specified depth within the subsurface region determined by the processor.

25. A computer readable medium configured for use in drilling operations, the medium comprising instructions that enable a processor to:
 (a) estimate from a velocity obtained from a seismic survey of a subsurface region of an earth formation: a formation pore pressure in a reservoir in the earth formation using an estimated density and an effective stress derived from the velocity,
 (b) an uncertainty associated with the estimate of the pore pressure of the subsurface region, said uncertainty depending at least in part on an uncertainty in the velocity, and
 (c) conduct additional drilling operations based on the estimated pore pressure and the estimated uncertainty in the pore pressure.

26. The computer readable medium of claim 25 further comprising at least one of:
 (i) a ROM, (ii) an EPROM, (iii) an EAROM, (iv) a Flash Memory, (v) an Optical disks, (vi) a magnetic tape, and (vii) a hard drive.

27. A method conducting drilling operations in a subsurface region of an earth formation, the method comprising:
 (a) obtaining a velocity of the subsurface region from a seismic survey; and
 (b) estimating from the obtained velocity:
  (A) a formation pore pressure of the subsurface region using a density estimated using the velocity and an effective stress of the subsurface region estimated using the velocity, and
  (B) an uncertainty associated with the estimated pore pressure of the subsurface region, said uncertainty depending at least in part on an uncertainty in the obtained velocity; and
 (c) completing the borehole by determining a number of casing segments needed to drill to a specified depth within the subsurface region using the estimated pore pressure and the estimated uncertainty in the pore pressure.

* * * * *